United States Patent [19]

Dial

[11] 4,138,515

[45] Feb. 6, 1979

[54] GEOMETRIC IRIDESCENT IMAGE

[76] Inventor: Emily C. Dial, 3802 S. 2850 East, Salt Lake City, Utah 84109

[21] Appl. No.: 671,265

[22] Filed: Mar. 29, 1976

[51] Int. Cl.[2] ............................ B32B 3/30; B32B 3/00

[52] U.S. Cl. ........................................ 428/30; 428/167; 428/336; 428/187; 428/163

[58] Field of Search ...................... 428/13, 29, 30, 163, 428/167, 187, 209, 461, 336; 350/162, 168; 40/130 F; 272/8 R, 85

[56] References Cited

U.S. PATENT DOCUMENTS

| | | | |
|---|---|---|---|
| 1,996,539 | 4/1935 | Dufay | 428/30 |
| 2,515,459 | 6/1970 | Wood | 350/162 R |
| 2,875,543 | 3/1959 | Sylvester et al. | 428/30 |
| 3,338,730 | 8/1967 | Slade et al. | 428/163 |
| 3,912,842 | 10/1975 | Swartz | 428/172 |

*Primary Examiner*—George F. Lesmes
*Assistant Examiner*—P. Thibodean
*Attorney, Agent, or Firm*—Criddle, Thorpe & Western

[57] ABSTRACT

A geometric image comprising both a nonreflective material and a metalized plastic film capable of dispersing visible light into its component colors, which colors may change relative to the angle of the light being dispersed and reflected back to the viewer.

8 Claims, 5 Drawing Figures

GEOMETRIC IRIDESCENT IMAGE

BACKGROUND OF THE INVENTION AND DESCRIPTION OF THE PRIOR ART

This invention relates to a geometric image comprising as component parts a nonreflective surface and a metalized plastic foil producing an iridescent effect. More particularly, this invention relates to a geometric object of art comprising an image and a background wherein the image and background are made of a combination of a nonreflective surface and a metalized plastic foil producing an iridescent effect.

Many materials are known in nature which produce an iridescent effect by various means, e.g., the scattering of light by minute droplets of water causing rainbows, the colors produced by a thin slick layer of oil over water, colors displayed by a soap bubble, mother of pearl or the plumage of some birds.

Technically speaking, iridescence is caused by the rainbow color effect exhibited in various bodies as a result of interference in a thin film or of defraction of light reflected from a ribbed surface.

Geometric images in two-dimensional, three dimensional, relief and other forms such as animals, humans, outdoor scenery, man-made objects, buildings, inanimate objects, words, mottos, letters, maps and the like have long been portrayed. However, it is believed that such characterizations have not been portrayed utilizing iridescent materials whereby the color reflected by the iridescent material will change or vary with the material used and the angle of light striking the material relative to the viewer.

OBJECTS AND BRIEF DESCRIPTION OF THE INVENTION

It is an object of this invention to provide a geometric image comprising a combination of an iridescent metalized plastic foil and a nonreflective background.

It is an object of this invention to provide a geometric image utilizing an iridescent metalized plastic foil and a nonreflective material whereby the image may be made of either the iridescent foil, the nonreflective material or a combination of both.

A still further object of this invention is to produce a geometric object or image utilizing a nonreflective surface and a plastic metalized foil containing a pattern effect on the iridescence of said material.

Principal features of this invention include primarily two materials arranged in any lettered, geometric or artistic fashion or configuration to produce an image, one of the materials being a nonreflective surface and the other material being a plastic metalized foil capable of breaking visible light into its component parts and reflecting said light to produce an iridescent effect.

Either the metalized foil or the nonreflective surface can be used as a background or as the image, or a combination of both may be used as will be more fully explained hereinafter.

The iridescent effect is brought about by the utilization of metalized flexible clear plastic film which may or may not contain a pattern. The back of the film is ribbed or grooved by equidistant lines which are extremely close together, i.e., on the order of from about $5\times10^{-5}$ to $25\times10^{-5}$ of an inch apart. Onto the back of the plastic is deposited a particulate light reflecting metallic layer, preferably aluminum, which has a thickness of about 0.5 to 1 millionth of an inch. The metal is placed on the film preferably by vacuum deposition and may be of various metallic colors with silver and gold colors being preferred. To obtain maximum effect, metalized foil should be viewed from the film side, i.e., through the film.

The images thus produced have a tendency to reflect the different colors of the spectrum depending upon the amount of dispersion of visible light, the amount of refraction, and the angle presented between the visible light and the viewer. Both interference through the clear plastic and defraction of light from the ribbed surface affect the breaking of the visible light into its component colors. The pattern in the foil, and the amount of visible light available for dispersion also affect the iridescence. As one views an image comprising the nonreflective material along with the iridescent plastic foil, the various colors of the visible spectrum are dispersed or separated into their component colors with the color changing according to the relative positioning of the foil with regard to the light source and the viewer. In other words, as one moves or the image is moved or tilted, the same portion of the image may reflect the various colors of the visible spectrum.

Such an effect is most eye appealing and serves to emphasize as well as beautify a geometric object.

The word geometric image includes images of any shape or configuration along either an x, y or x, y, z coordinate. Two-dimensional, three-dimensional, relief, cubes, spheres and other forms may be used. A two-dimensional image is preferred and such image may also contain a substantially flat surface wherein certain portions of the image and/or background will contain a raised surface, i.e., a relief. For example, when portraying certain images the image may be raised from about 1/32 to ¼ of an inch above the background. However, both the raised surface and the background would be flat. Therefore, placed in its proper perspective, a two-dimensional effect would still be obtained.

If desired certain portions of the foil may be highlighted or colored to enhance the effect of the image. The color will preferably be translucent and may or may not affect the iridescent effect of the coil. One or more translucent or foil colors may be used in combination. The highlighting will be of a nonreflective material and may outline or be drawn onto the image.

The image may be presented in different ways as illustrated and explained by the following drawings which are intended to be exemplary of the invention only and are not intended to be limitations thereof as only a two-dimensional effect is portrayed.

DRAWINGS OF THE INVENTION

DETAILED DESCRIPTION

Figure 1:
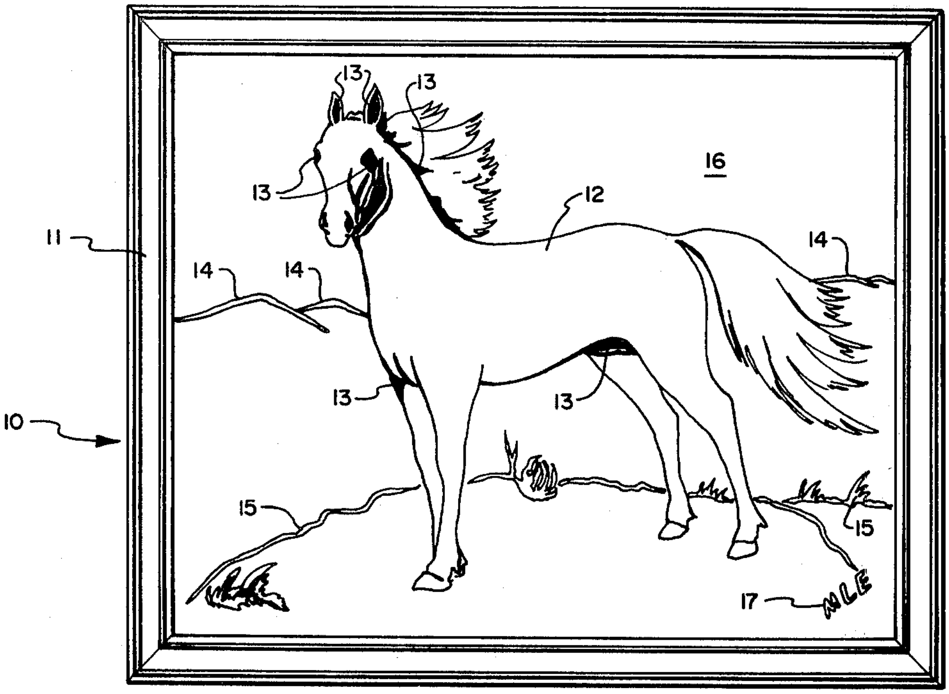
FIG. 1 is a perspective view of a two-dimensional image having a nonreflective background with iridescent foil thereon.

There is shown in the drawings a completely descriptive embodiment of the invention. However, due to the nature of the materials used, a full appreciation of the invention cannot be had without actually visualizing a geometric image.

FIG. 1 shows a two-dimensional image 10 having a frame 11, which frame is not essential to the invention, surrounding the image. A horse 12 is portrayed being formed from the iridescent foil and being highlighted with a nonreflective paint in certain areas 13 to emphasize the detailed features of the horse 12. Thus the combination of the foil plus the highlighting 13 portrays to the viewer a complete visual image of the horse 12. An outline of mountains 14 made from the iridescent foil forms a part of the background. Further accenting the scene is an outline of vegetation 15 with the remainder of the background 16 being a nonreflective, preferably dark surface such as a flat paint, velvet, felt, burlap, cork and any variety of natural or synthetic fibers dyed with a nonreflective dye. The artist's initials 17 or proper copyright notice, tradename and the like may also be constructed from the iridescent foil or other material and placed on the background surface.

The non-reflective material may be applied as a paint, or if a fabric, may have an adhesive surface or be otherwise glued or fastened to a backing material (not shown). As previously indicated, the image portrayed may be in relief being slightly elevated from the background.

Figure 2:
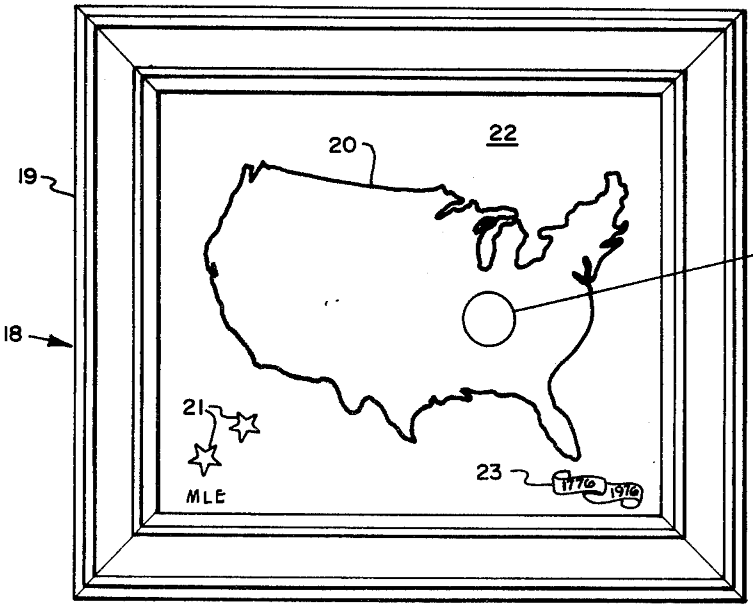
FIG. 2 is a perspective view of a two-dimensional image of a map of the adjacent forty-eight states of the United States of America with a flat nonreflective background.

FIG. 2 is similar in construction to FIG. 1 comprising a two-dimensional image 18 surrounded by a frame 19. The image 20 is of the contiguous forty-eight states of the United States of America with Hawaii and Alaska being portrayed by stars 21 or other suitable means. The images 20 and 21 are made of the reflective iridescent foil and are mounted onto a nonreflective background 22. Since 1976 is the bicentennial year of the United States of America an appropriate designation 23 could be made from the foil and highlighted or printed upon with a nonreflective material.

Figure 3:
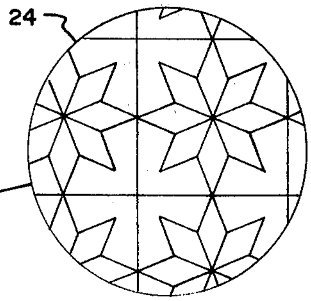
FIG. 3 is an exploded view of the surface of a patterned iridescent foil taken from FIG. 2.

While the foil may be obtained in different patterns, one such pattern 24 is illustrated in FIG. 3. The pattern, in addition to the thickness of the plastic film causing refraction and the lines adding to the dispersion of visible light, also affects the manner in which the iridescence is reflected.

Figure 4:
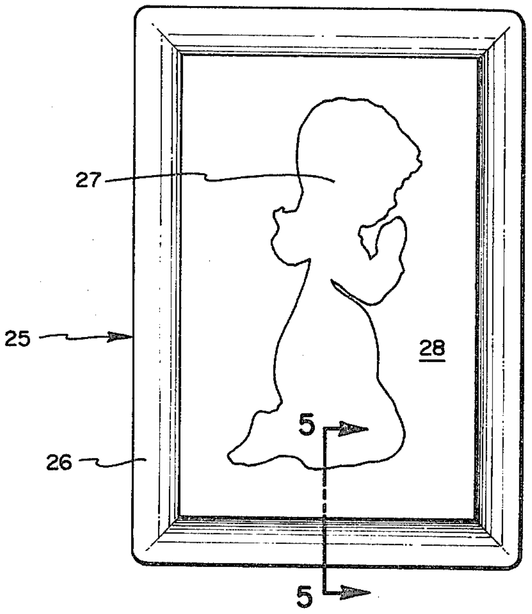
FIG. 4 is a two-dimensional view of a child wherein the nonreflective surface forms the image of the child and the iridescent foil provides the background.

FIG. 4 further illustrates a different embodiment of the invention and consists of a two-dimensional image 25 mounted on a solid board having a routed perimeter 26. The image 27 is a flat, preferably dark, nonreflective material and the background 28 is made of the reflective iridescent foil. This is the reverse of FIGS. 1 and 2 wherein the image was of the foil and the background was nonreflective.

Figure 5:
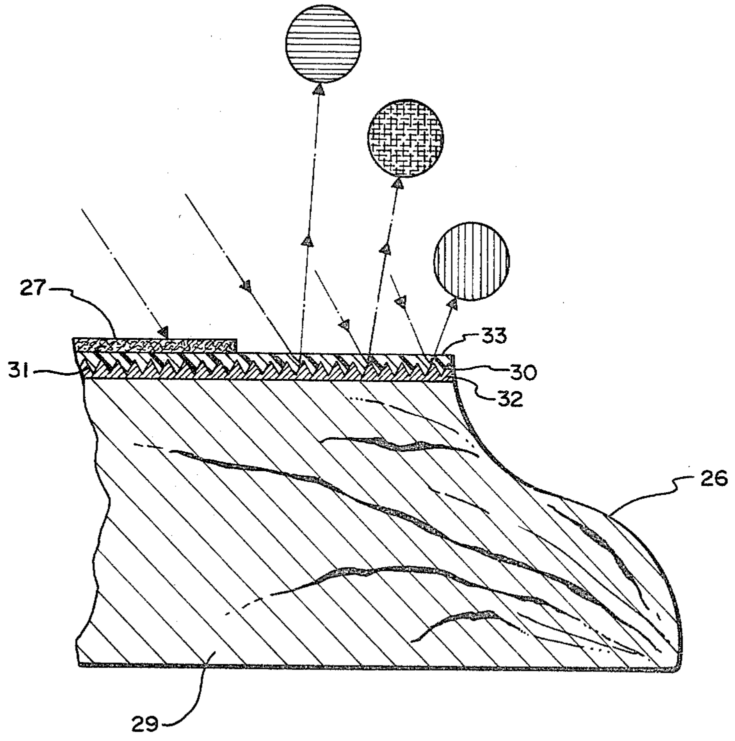
FIG. 5 is an exploded partial cross sectional view taken along lines 5—5 of FIG. 4 wherein the cross section of the iridescent foil is greatly exaggerated.

FIG. 5 is a partial cross sectional view of FIG. 4 taken along lines 5—5 and rotated counter-clockwise 90°. FIG. 5 illustrates a wooden base having a routed outer edge or perimeter 26 onto which has been fastened an iridescent foil 30 by adhesive means. The foil 30 is greatly exaggerated in thickness since to the naked eye the grooves are equidistantly spaced $7 \times 10^{-5}$ inches apart. Onto the grooves 31 is vacuum deposited less than $1 \times 10^{-6}$ of an inch of aluminum 32 which serves as a reflective surface. The depth of the clear plastic film 33 will depend upon the plastic used and the degree of refraction desired. Any clear flexible plastic may be used without deviating from the scope of the invention. As illustrated in FIG. 5, the visible light is broken into its component parts by refraction and diffusion to produce an iridescent effect depending upon the variables involved. As the foil is turned relative to the visible light or as the viewer moves the same portion of the foil may reflect different monochromatic colors. As shown in FIG. 5, the nonreflective surface may adhere to the foil or, in the alternative, the foil may be cut away to reveal the nonreflective surface.

Any desired lettering, image or configuration may be used without departing from the scope of the invention. Obviously, foils of two or more colors may be combined as may different nonreflective backgrounds. While the term "dark" nonreflective background has preferably been used the invention should be construed as including any nonreflective background which does not take away from the iridescent effect of the foil and lighter backgrounds may be utilized if they serve the same purpose. Also, the foil may be colored or highlighted to produce the desired effect.

The invention is therefore to be limited only by the scope of the claims appended hereto.

I claim:

1. A composite laminate forming a geometric image wherein said laminate comprises a substrate having adhered thereon a flexible foil comprising a clear plastic having a grooved surface on its underside, said grooves being from about $5 \times 10^{-5}$ to $25 \times 10^{-3}$ of an inch apart and coated with a thin layer of light reflecting material of a thickness of between $0.5 \times 10^{-6}$ and $1 \times 10^{-6}$ inches, said foil being capable of dispersing and reflecting visible light into its component colors; and an overlying non-reflective layer adhered to the other side of said foil opposite said grooves which, in conjunction with the foil, produces the desired image.

2. A geometric image according to claim 1 wherein the metal is aluminum.

3. A geometric image according to claim 2 wherein the foil is highlighted with a nonreflective material to emphasize the desired image.

4. A geometric image according to claim 2 wherein the image is selected from words, letters, maps, animals, human beings, man-made objects, outdoor scenery, bridges, buildings or other inanimate objects.

5. A geometric image according to claim 4 wherein the image is made of the iridescent foil and the background is a nonreflective material.

6. A geometric image according to claim 4 wherein the image is made of nonreflective material and the background is an iridescent foil.

7. A geometric image according to claim 4 wherein the image is two-dimensional.

8. A geometric image according to claim 4 wherein a portion of the plastic foil is colored with a translucent material.

* * * * *